June 22, 1971  J. A. JONES  3,586,562

METHOD OF MAKING SCRAMBLED BRANCHED FIBER OPTICS

Filed Sept. 24, 1969

INVENTOR.
JAMES A. JONES
BY
ATTORNEY 3,586,562
METHOD OF MAKING SCRAMBLED BRANCHED
FIBER OPTICS
James A. Jones, Sturbridge, Mass., assignor to American
Optical Corporation, Southbridge, Mass.
Filed Sept. 24, 1969, Ser. No. 860,545
Int. Cl. B65h 81/00; G02b 5/16
U.S. Cl. 156—174                    15 Claims

ABSTRACT OF THE DISCLOSURE

A method for uniform or mixed scrambling of branched fiber optics, winds an initial layer of fiber on a drum of a fiber drawing machine which has spaced, double-faced tape placed on the drum parallel to the axis of the drum, and the fibers strands are placed approximately two diameters apart. A second layer of tape is placed over the fibers and on the first layer of tape, and a second layer of fiber is wound around the drum in the space between the fibers of the first layer. A final layer of tape is placed over the second layer of tape above the other layers of tape. The fibers intermediate the tape strips are secured together by lacquer or cement, and the fibers are then cut in the lacquered section. A cut is made centerwise of the tape strips along a line parallel to the axis of the drum forming a strip of fibers with one lacquered end and a divided taped end. The lacquered end is then rolled into the desired cross-sectional configuration, and the separated layers in the tape section are then rolled into the desired configuration forming an optical fiber with a common end and a branched end.

---

Fiber, light conducting devices embodying an assembly of elongated, relatively fine light transmitting fibers are well known. Such units usually provide a relatively large number of the light conducting fibers, arranged in a bunched relation so as to collectively provide a light accepting end and at the opposite end a light emitting end. In one method of production of the optical fibers, a rod is heated and drawn out into a thread-like fiber which may be treated with a coating and then wound on a drum. This fiber is cut to a predetermined length and bunched or gathered into a desired cross section, for example a circular rod. The construction and use of such fiber drawing machines is well known.

According to the present invention there is provided a method of producing uniform scrambled, branched fiber optics wherein a plurality of optical fibers are gathered together in a common end of desired cross-sectional configuration and the opposite end is separated into two or more branches. The device utilizes conventional drawing equipment and provides an economical means for forming a uniformly scrambled optical fiber unit. The method provides complete uniform mixing of the branch fibers in the common end of a multiple channel fiber optic device. Complete, uniform mixing occurs when a fiber from one branch is not completely isolated; that is, surrounded only by fibers from the same branch, but is adjacent to at least one fiber from another branch.

In a prior art method of producing branched fiber optics, it was necessary to pot and surface one end of a bundle of fibers for viewing a microscope while the opposite end was hand separated into two branches. The loose fibers of the branched end were separated one by one, into the two branches. Each branch was illuminated with a different color of light. It was necessary for the operator to view the common end, while moving the loose fibers into one branch or the other, and check for the isolation by color under the microscope. With this technique it was possible to find and isolate fibers and move it to the desired branch. The technique required that each fiber be individually handled and considerable skill was required to keep the fibers from becoming tangled. The time necessary to perform the procedure increased as the number of fibers in the unit increased, and as the length of the fibers increased the longer the branches become and the greater the problem of tangling became. Further, a count of the fibers was necessary in order to have the same number of fibers in each branch.

Included among the objects and advantages of the present invention is a process for scrambling branched fiber optics.

Another object to the invention is to provide means for producing uniformly scrambled branched fiber optics in which the number of fibers in a branch may be randomly or uniformly mixed, and the ratio of fibers in one branch to the other may be changed as desired.

Another object to the invention is to provide a method of uniform scrambling branched fiber optics wherein the fiber in one channel is assured of being next to a fiber from a different channel at the common end of the device.

A still further object of the invention is to provide a process for scrambling branched fiber optics in which the number of fibers in each channel may be simply and easily varied as desired.

Yet another object of the invention is to provide a method for scrambling branched fiber optics wherein the tangling and breakage of the fibers is virtually eliminated.

Still another object of the invention is to provide a process for manufacturing scrambled branched fiber optics of large cross-sectional areas and relatively long lengths.

These and other objects and advantages of the invention may be readily ascertained by referring to the drawing and appended illustrations in which.

Figure 1:
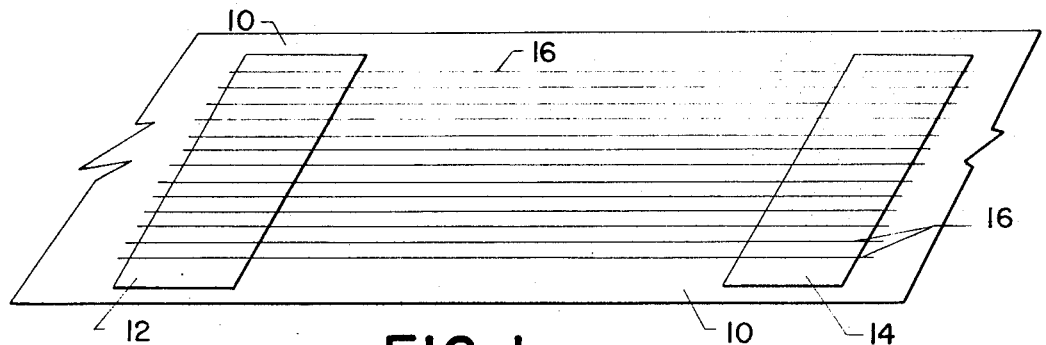
FIG. 1 is a perspective view of one step in the method of making a branched fiber optic.
Figure 2:
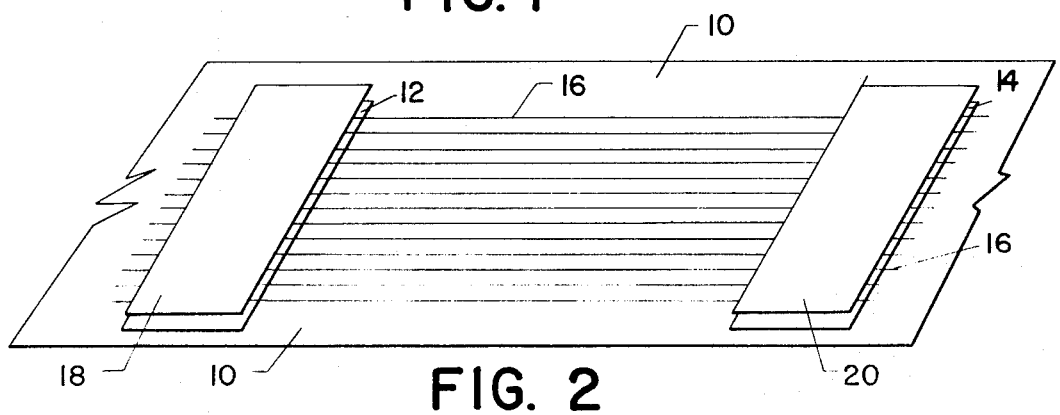
FIG. 2 is a perspective view of a subsequent step in the method of manufacturing a branched fiber optic.

In the drawings, a sheet of Mylar film 10 is placed circumferentially on the drum of a fiber drawing machine, one such fiber drawing machine is illustrated in Hicks et al. Pat. No. 3,104,191 issued Sept. 17, 1963. At intervals around the drum a series of strips of double-faced, pressure sensitive tape is placed on the Mylar film; strips 12 and 14 illustrate one section on the drum. The strips are placed parallel to the drum axis, and are placed at a distance apart which is equal to either slightly more than one or two times the final length of the optical unit desired. With the pressure sensitive tape in place, fiber, from the forming machine or a spool, is then wound on the drum with the center line of adjacent fiber strands being spaced-apart equal to approximately two fiber diameters. As shown in FIG. 1, the fiber 16 is wound on the drum so that it crosses the tape strips 12 and 14 and is in contact with the strips. When a sufficient number of revolutions have been made to form the desired number of fiber strands, the drum is stopped, and a piece of single-faced pressure sensitive tape 18 is placed over the fibers on the top of tape strip 12. The tape 18 seals to the tape 12 holding the fibers in spaced position therebetween. In a like manner, a piece of single-face pressure sensitive tape 20 is placed over the tape 14, and it, likewise, seals to the strip 14 securing the fibers in place therebetween.

Figure 4:
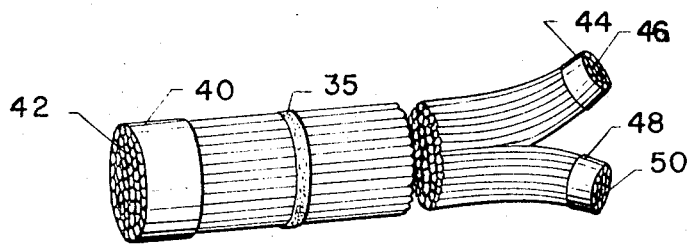
FIG. 4 is a perspective view of a finished two branched fiber optic.

A second strip of pressure sensitive tape 22 is placed on top of the single-faced strip 18, and a similar strip of double-faced tape 24 is placed on top of the single-faced strip 20. The drum is again started and a second layer strands 26 of the optical fiber is then laid down on the drum between the strands of the layer 16 and passing over each of the second double-faced strips of pressure sensitive tape. This secures the fibers onto the second tape strip, for example, strips 22 and 24. When a sufficient number of strands 26 are laid down on the drum, the machine is again stopped. A strip of single-faced, pressure sensitive tape 30 is placed on top of the strip 22 and the strands 26 thereon. In a similar manner, a single-faced, pressure sensitive tape strip 32 is placed on top of the strip 24 with the strands 26 of the fiber therebetween. The strips 30 and 32 are single-faced pressure sensitive tape strips. Lacquer, plastic, or cement is then painted across the fibers in a narrow band at position 34 approximately half way between the pressure sensitive tape strips to join the fibers. The lacquer, plastic or cement secures the two layers together in flat and spaced relation. The right tape section is then cut along a cut line 36, approximately centerwise of the stacked tapes and axially of the drum, and the fiber is then cut in front of the lacquered section leaving a lacquered section between the ends of the fiber (adjacent the end opposite the tape section) and the tape section. The taped end is then cut perpendicularly to a width equal to the number of fibers desired in the brances, for example, along cut line 38 to provide two branches of equal number of fibers. This forms a section of fibers held at one end by the lacquer and at the other end by the tape. The lacquered section is then rolled and gathered into the cross-sectional configuration desired for the common end. The fibers in this end may be secured in place by a piece of heat shrinkable plastic tube 40, shown in FIG. 4, holding the common ends into a circular configuration 42, for example. The cut for the common end may be adjacent the lacquered section, and another lacquered section 35 provided holding the fibers together. The top, single-faced tape and the double-faced tape is then peeled off the sandwich of tapes at each branch lifting the upper layer of the fibers with it. The fibers are then cut loose from the tape and secured in a circular configuration, for example, by means of a heat shrinkable tube 44 placed around the branched bundle end 46. In a similar manner, a tube 48 of heat shrinkable plastic is then placed around the other branched end securing the second branched bundle into an end 50. The resulting uniformly mixed bundle may then be built in the desired final product.

The cut of the fibers adjacent lacquered section 34 produces a unit of a length which is approximately one half the distance between the two tape sections. By cutting adjacent the lacquered section 35, a unit is produced which is approximately as long as the space between the two taped sections. By varying the distance between the taped sections, different lengths of optical units may be made. By varying the width of the strands (by increasing or decreasing the number of strands) the cross-sectional area of the finished unit may be varied. The ratio of fibers in one branch to any other may be made by changing the ratio of spacing in the different layers.

Figure 3:
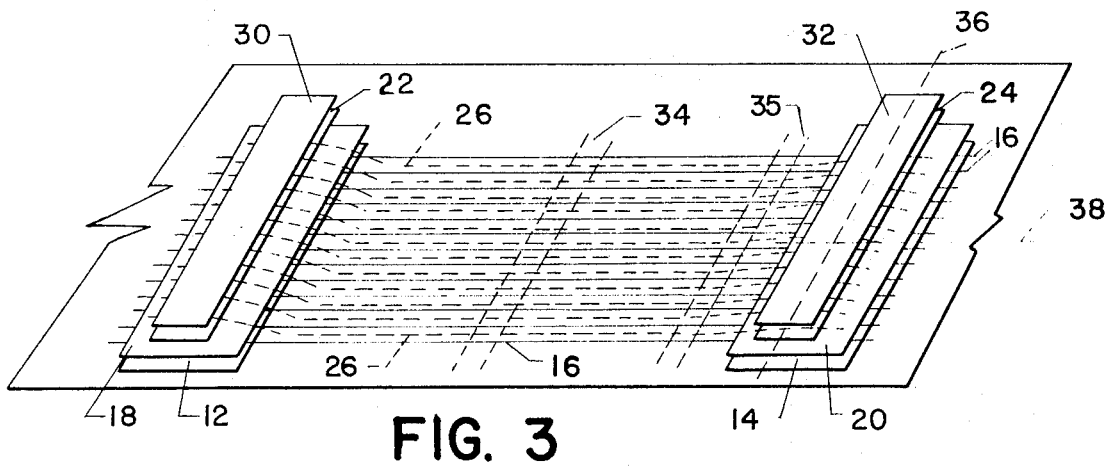
FIG. 3 is a perspective view of the optical fibers aligned in position for cutting prior to forming branched optical fibers.

The wrapping system of having the top layer of fiber strands between two strands of the lower layer insures that each fiber in a branch or channel is next to a fiber of a different branch. By choosing the position of cut for the branches (the position indicated by 38 in FIG. 3) the number of fibers in each channel may be predetermined. These may be arranged with the two branches having the same number of fibers, or the number of fibers in each branch may be varied according to the desires of the designer. By correctly spacing the first layer of fibers, it is possible to provide three or more layers, in which case each layer is provided with a single and double-faced tape for securely holding the layers properly spaced one from the other, with the individual fibers accurately positioned and securely held in that position. This provides means for producing any number of branches, randomly mixed or uniformly mixed, depending upon the needs of the system. Handling of the individual fibers is at a minimum during the manufacture of the branched fiber optics.

What is claimed is:

1. A method of forming branched fiber optics comprising:
   forming a first layer of elongated optical fibers in side by side relation and each spaced from its neighbor a predetermined distanec apart;
   securing a first section of said first layer adjacent an end in a fixed position;
   placing a cover on said first section of said first layer so as to cover said fibers therein;
   forming a second layer of elongated optical fibers in side by side relation between the strands of said first layer, with the strands of said second layer passing over the top of said covering of said first layer;
   securing together the strands of a first section of second layer superposed above said first layer;
   securing the strands of a second section of both said layers together and in their side by side relation at a point spaced from said superposed first sections and adjacent an end spaced from said first superposed sections;
   gathering said secured both layers adjacent the second section into a desired cross-sectional configuration;
   and gathering a portion of each said first sections into separate branches of a desired cross-sectional configuration.

2. A method according to claim 1 wherein pressure sensitive tape secures said first layer of fibers in said first section.

3. A method according to claim 2 wherein each layer is covered by pressure sensitive tape.

4. A method according to claim 1 wherein said gathering includes rolling said side by side strands so that fibers in each branch are adjacent fibers in the other branch.

5. A method according to claim 1 wherein said fibers of said first layer are spaced an equal distance apart.

6. A method according to claim 5 wherein said fibers of said first layer are spaced two diameters apart.

7. A method according to claim 1 wherein said superposed strips are divided into two portions along the line of said strands with an equal number of strands from each layer in each branch.

8. A method according to claim 1 wherein said strands are wound on a drum of an optical fiber drawing machine.

9. A method according to claim 8 wherein a plurality of two faced strips of pressure sensitive tape are spacedly mounted on said drum positioned axially of said drum.

10. A method according to claim 9 wherein a single faced strip of pressure sensitive tape is placed over said strands to secure the same in position.

11. A method according to claim 9 wherein said optical fibers are cut in said tape strips forming the ends of the branches.

12. A method according to claim 8 wherein said secured strands of said second sections are severed adjacent said secured second sections.

13. A method of forming branched fiber optics comprising:
    forming a first layer of elongated optical fibers in side by side relation and on the same plane;
    covering a portion of said first layer across the lateral extent of said layer;
    forming a second layer of elongated optical fibers in side by side relation with said first layer with said fibers of said layers alternating and in the same plane, and with a portion thereof superposed and separated from said covered portion of said first layers;

separating said superposed layers, longitudinally of said fibers, into at least two portions each containing fibers from each said layer thereby forming at least two branches;

gathering said fibers of both said layers adjacent one end forming a common end of predetermined cross-sectional configuration; and gathering each said branch into a predetermined cross-sectional configuration.

14. A method according to claim 13 wherein each branch contains the same number of fibers from each layer.

15. A method according to claim 13 wherein each branch contains a different number of fibers from each layer.

References Cited
UNITED STATES PATENTS

| | | | |
|---|---|---|---|
| 3,104,191 | 9/1963 | Hicks, Jr., et al. | 156—174 |
| 3,215,029 | 11/1965 | Woodcock | 156—174X |
| 3,327,584 | 6/1967 | Kissinger | 350—96(B) |
| 3,356,854 | 12/1967 | Humphrey | 350—96(B) |
| 3,472,718 | 10/1969 | Siegmund | 156—174 |
| 3,473,872 | 10/1969 | Okamura | 156—174X |
| 3,530,341 | 9/1970 | Hutchinson | 350—96(B) |

CARL D. QUARFORTH, Primary Examiner

R. S. GAITHER, Assistant Examiner

U.S. Cl. X.R.

156—175, 181; 350—96B